United States Patent
Masuda

(10) Patent No.: US 8,379,110 B2
(45) Date of Patent: Feb. 19, 2013

(54) IMAGE SENSING APPARATUS AND SYSTEM

(75) Inventor: Shinichi Masuda, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 12/860,344

(22) Filed: Aug. 20, 2010

(65) Prior Publication Data
US 2011/0063461 A1    Mar. 17, 2011

(30) Foreign Application Priority Data

Sep. 16, 2009  (JP) ................................. 2009-214979

(51) Int. Cl.
*H04N 5/225* (2006.01)

(52) U.S. Cl. .................................................. 348/231.4

(58) Field of Classification Search ............... 348/231.4, 348/207.99, 357; 352/1–37; 381/94.1, 94.3, 381/92
See application file for complete search history.

(56) References Cited

U.S. PATENT DOCUMENTS

| | | | | |
|---|---|---|---|---|
| 2003/0161484 | A1* | 8/2003 | Kanamori et al. | 381/71.7 |
| 2006/0132624 | A1* | 6/2006 | Yuyama | 348/241 |
| 2011/0096206 | A1* | 4/2011 | Okazaki | 348/241 |
| 2012/0154610 | A1* | 6/2012 | Rahbar et al. | 348/207.99 |

FOREIGN PATENT DOCUMENTS

| | | |
|---|---|---|
| JP | 2005-130328 | 5/2005 |
| JP | 2005-244613 | 9/2005 |

OTHER PUBLICATIONS

Machine Translation of JP 2005-244613, Machida, Sep. 8, 2005.*

* cited by examiner

*Primary Examiner* — Aung S Moe
(74) *Attorney, Agent, or Firm* — Cowan, Liebowitz & Latman, P.C.

(57) ABSTRACT

An image sensing apparatus which senses the optical image of an object using a lens unit having a movable lens can reduce the influence of noise generated upon driving the lens from the first sound signal, based on the first sound signal obtained by the first microphone unit for collecting an object sound, and a second sound signal obtained by the second microphone unit for collecting noise. The second microphone unit is arranged at a position where the relative positional relationship with the generation source of noise generated upon driving the lens does not change even if the lens is moved.

27 Claims, 7 Drawing Sheets

F I G. 5A
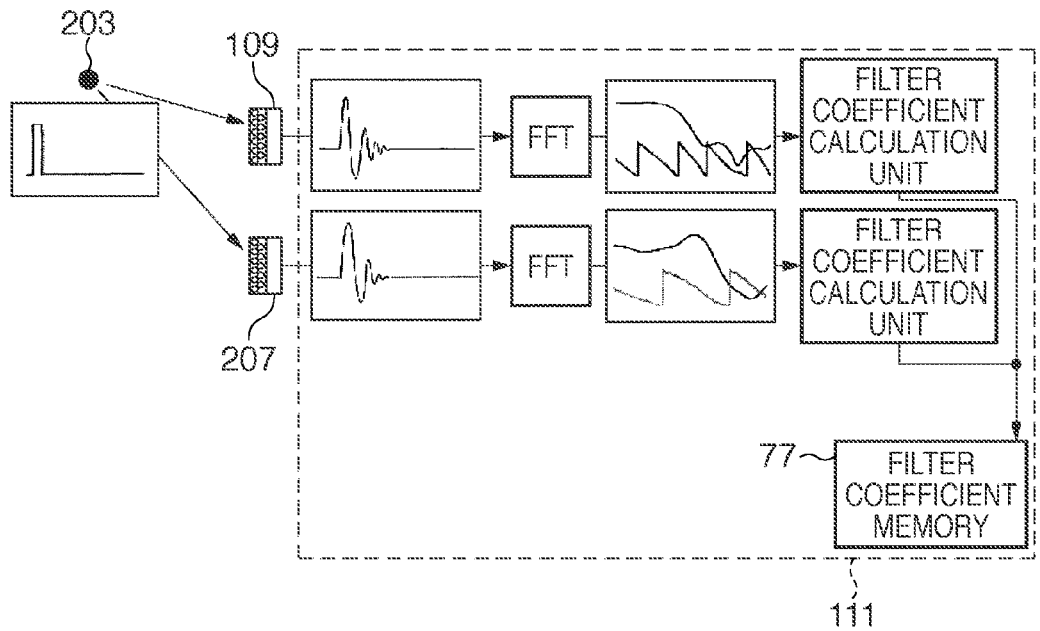
F I G. 5B
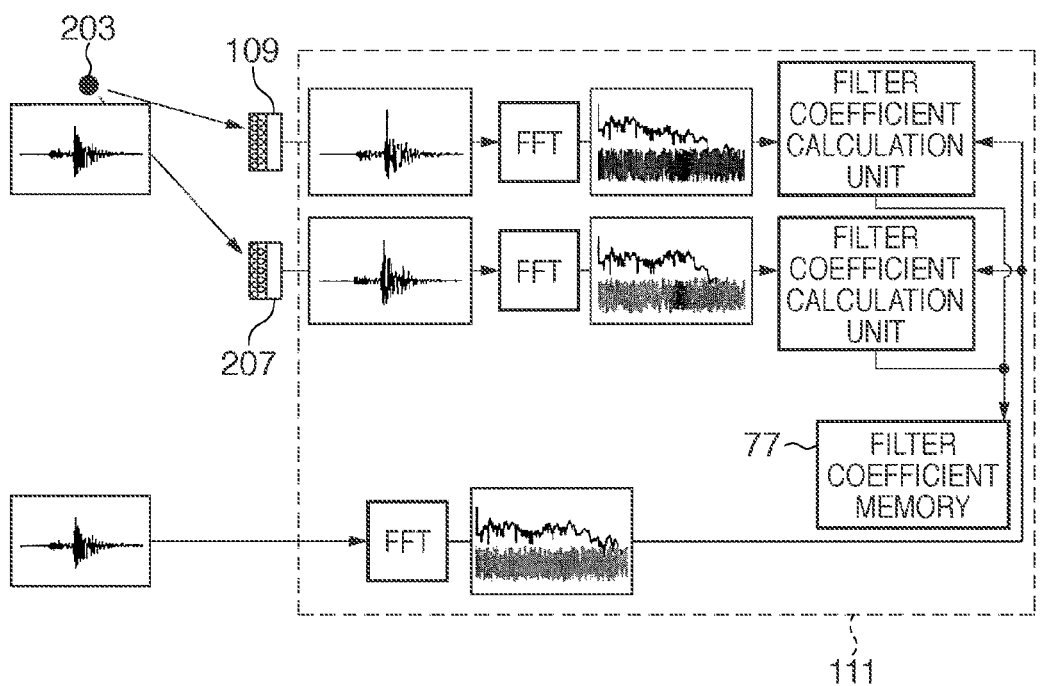

IMAGE SENSING APPARATUS AND SYSTEM

BACKGROUND OF THE INVENTION

1. Field of the Invention

The present invention relates to a noise canceling technique when an image sensing apparatus records a sound along with an image sensing operation.

2. Description of the Related Art

Recent image sensing apparatuses such as a digital camera are gaining more sophisticated functions. Some image sensing apparatuses can sense moving and still images. When sensing a moving image, a sound is recorded at the same time as sensing images of the moving image, and the images and sound are recorded as one data. At this time, it is desirable to acquire a sound generated by an object so that it can be actually perceived by the human auditory perception. However, the sound is affected by noise such as driving noise of the apparatus that is generated inside the image sensing apparatus in recording. To reduce the influence of noise in sound recording, various image sensing apparatuses have been proposed.

Japanese Patent Laid-Open No. 2005-130328 discloses a technique of removing the frequency band of noise from a sound signal recorded via the microphone of an image sensing apparatus. This technique adopts a bandpass filter which cuts off the frequency band of noise generated by a noise source inside the image sensing apparatus.

Japanese Patent Laid-Open No. 2005-244613 discloses a technique using a noise microphone arranged inside an image sensing apparatus, in addition to an object microphone. In this technique, filters are applied to signals output from the respective microphones so as to cancel out only sound signals having noise components when these output signals are added.

The effect of cutting off the frequency band of noise, like Japanese Patent Laid-Open No. 2005-130328, can be expected when the frequency band of a noise signal is narrow. However, if the frequency band of a noise signal is wide, even the frequency band of a sound generated by an object may be cut off.

When filters are applied to respective sound sources, like Japanese Patent Laid-Open No. 2005-244613, it is important whether the filters are appropriately modeled for sounds generated by the noise source and object. If the property of the noise source changes as in a lens-interchangeable camera or the like, it is difficult to model the filter for the noise source in advance, and satisfactory noise reduction may not be expected. Especially in Japanese Patent Laid-Open No. 2005-244613, the microphone is arranged to acquire noise from the noise source in the image sensing apparatus. However, the noise source may be moved within the image sensing apparatus. As the noise source moves, the frequency characteristic of a signal output from the noise microphone also changes. This makes it more difficult to model the filter for the noise source, and noise may not be properly reduced.

SUMMARY OF THE INVENTION

The present invention has been made to solve the above problems. The present invention provides a technique of reducing the influence of noise generated by a noise source in an image sensing apparatus when recording a sound along with image sensing.

The present invention in its first aspect provides an image sensing apparatus comprising: an image sensing unit adapted to generate an image signal from an optical image of an object; a lens unit adapted to form the optical image of the object on the image sensing unit, where the lens unit can drive at least one of a lens and diaphragm mechanism of the lens unit; a first microphone unit adapted to acquire a first sound signal by sound collection in order to collect an ambient sound; a second microphone unit adapted to acquire a second sound signal by sound collection in order to collect noise generated upon driving the lens unit; and a noise reduction processing circuit adapted to reduce, from the first sound signal based on the first sound signal and the second sound signal, influence of the noise generated upon driving the lens unit, wherein the second microphone unit is arranged at a position where a relative positional relationship with at least one generation source of noise generated upon driving the lens unit does not change even if the lens unit is driven.

Further features of the present invention will become apparent from the following description of exemplary embodiments (with reference to the attached drawings).

BRIEF DESCRIPTION OF THE DRAWINGS

FIGS. 5A and 5B are views for explaining the system identification process;

DESCRIPTION OF THE EMBODIMENTS

A preferred embodiment of the present invention will be described in detail below with reference to the accompanying drawings. In the following embodiment, the present invention is applied to an image sensing apparatus, for example, a digital camera which can record a sound in synchronism with an image sensing operation, is equipped with a detachable lens barrel, and can collect noise generated by a noise source that moves within the lens barrel. However, the present invention is applicable to even an image sensing apparatus which acquires noise from a noise source that is arranged not in the lens barrel but in the image sensing apparatus and generates noise while moving, and which can sense an image at the same time as recording an arbitrary sound.

Figure 1:
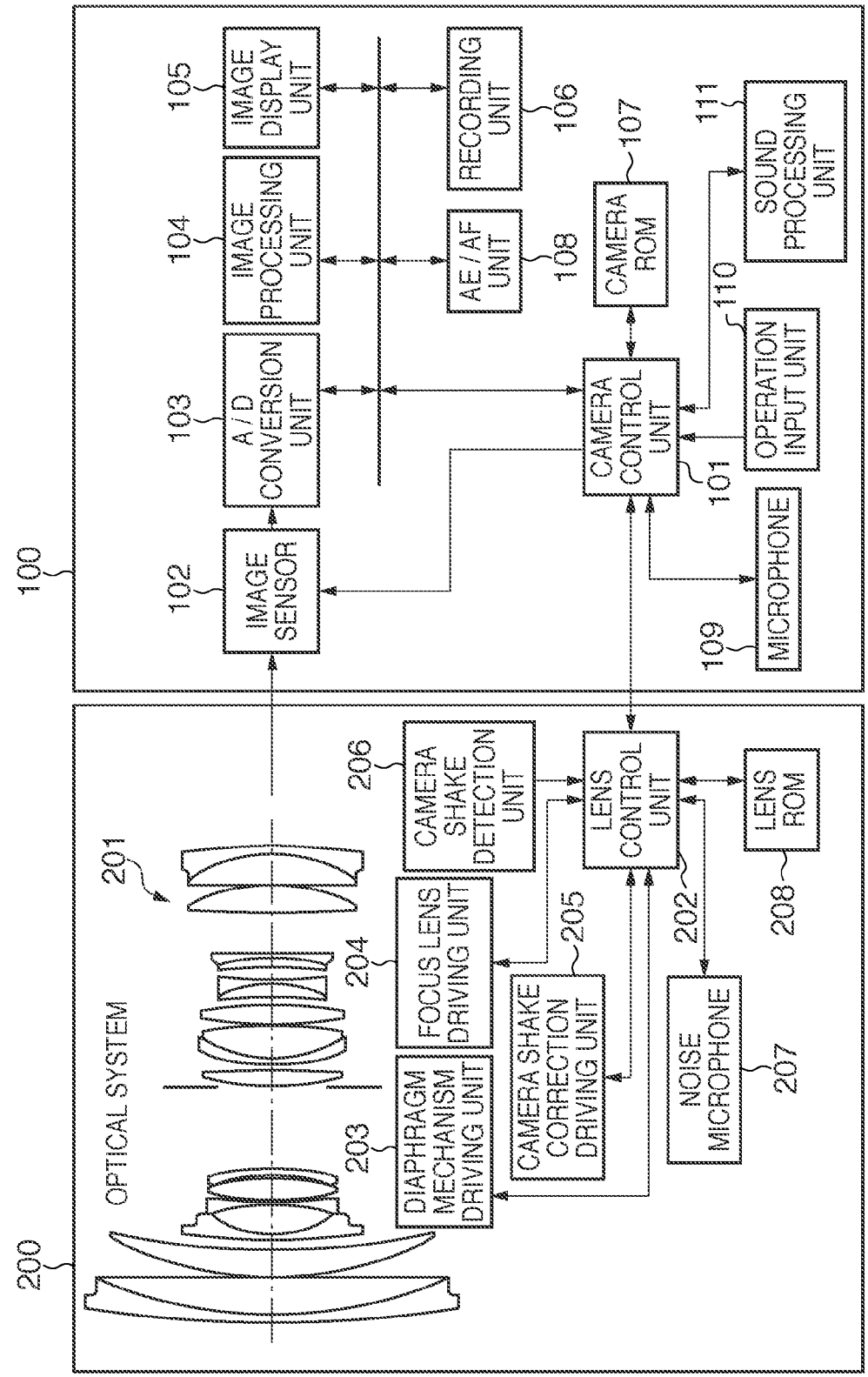
FIG. 1 is a block diagram exemplifying the functional arrangements of an image sensing apparatus and lens barrel according to an embodiment.

FIG. 1 is a block diagram showing the functional arrangements of a digital camera 100 and lens barrel 200 according to the embodiment of the present invention.

A camera control unit 101 controls the operation of each block of the digital camera 100. The camera control unit 101 expands, into a camera RAM (not shown), the operation program of each block of the digital camera 100 that is stored in, for example, a camera ROM 107. By executing the operation program, the camera control unit 101 controls the operation of each block of the digital camera 100. An image sensor 102 is, for example, a CCD sensor or CMOS sensor. The image sensor 102 photoelectrically converts light which is reflected by an object and enters the digital camera 100 via an optical system 201 of the lens barrel 200. The image sensor 102 outputs the obtained analog image signal to an A/D conversion unit 103. The A/D conversion unit 103 A/D-converts the input analog image signal, outputting digital image data. An image processing unit 104 applies predetermined image processes to digital image data obtained by A/D conversion by the A/D conversion unit 103. The predetermined image processes include, for example, a resolution conversion process and color tone adjustment process. The camera control unit 101 controls the image processing unit 104 to perform processes based on image sensing settings stored in the camera ROM 107. An image display unit 105 is a display device such as a liquid crystal display. The image display unit 105 reads out a digital image obtained by A/D conversion by the A/D conversion unit 103, or an image recorded by a recording unit 106 (to be described later), and displays the readout image in the display area of the image display unit 105. In accordance with an image recording format stored in the camera ROM 107, the recording unit 106 compresses/decompresses an image having performed the image process by the image processing unit 104. The recording unit 106 records the resultant image on a recording medium (not shown) connected to the recording unit 106. The recording medium may be a recording area ensured in the digital camera 100, or a removable recording device such a memory card or HDD connected to the digital camera 100. The digital camera 100 in the embodiment can record an object sound in synchronism with an image sensing operation. The recording unit 106 records an object sound acquired by a microphone 109 (to be described later), together with an image having performed the image process by the image processing unit 104. The camera ROM 107 is, for example, a rewritable nonvolatile memory. The camera ROM 107 stores various settings necessary for the operation of each block, such as the image sensing resolution and recording format, a GUI displayed on the image display unit 105, and the like, in addition to the operation program of each block of the digital camera 100. An AE/AF unit 108 spectroscopically analyzes, for example, light which is reflected by an object and enters the digital camera 100 via the optical system 201. Then, the AE/AF unit 108 detects the contrast of the object image using a line sensor (not shown), and detects a position where a focus lens used in a focus lens driving unit 204 (to be described later) is focused on the object image. Also, by using a photometry sensor (not shown), the AE/AF unit 108 measures, for example, light which is reflected by an object and enters the digital camera 100 via the optical system 201. Then, the AE/AF unit 108 calculates the diaphragm value of a diaphragm mechanism used in a diaphragm mechanism driving unit 203 (to be described later) so as to obtain an appropriate light receiving amount.

The microphone 109 is a sound collection microphone, which is arranged, in the digital camera 100 to acquire an object sound when recording a sound along with image sensing using the digital camera 100. The microphone 109 outputs an acquired sound (output signal) to a sound processing unit 111 (to be described later) without directly recording it. An operation input unit 110 is an input interface that accepts an input from the user to the digital camera 100. The operation input unit 110 includes, for example, a shutter button for accepting an input from the user to start an image sensing operation, a zoom button for accepting an input from the user to change the angle of view of an object image to be sensed, and a power button. Upon accepting an input from the user to each button of the operation input unit 110, the operation input unit 110 notifies the camera control unit 101 of the input. The sound processing unit 111 processes signals output from the microphone 109 and a noise microphone 207 (to be described later). The sound processing unit 111 outputs the obtained recording sound to the recording unit 106, thereby recording it. More specifically, a sound source separation process is executed using a signal output from the noise microphone 207 in order to reduce noise from a signal output from the microphone 109.

A lens control unit 202 controls the operation of each block of the lens barrel 200. The lens control unit 202 reads out the operation program of each block of the lens barrel 200 from, for example, a lens ROM 208, expands it in a lens RAM (not shown), and executes it to control the operation of each block of the lens barrel 200. In the embodiment, the lens barrel 200 is detachable, and the digital camera 100 and lens barrel 200 have electrical contacts (not shown), respectively. In response to energization to the electrical contacts, the camera control unit 101 and lens control unit 202 detect that the lens barrel 200 is mounted on the digital camera 100, and then become communicable with each other. More specifically, the camera control unit 101 and lens control unit 202 operate as follows. For example, the camera control unit 101 transmits, to the lens control unit 202, a position where the focus lens is focused on an object image, which is calculated by the AE/AF unit 108. The lens control unit 202 controls the operation of the focus lens driving unit 204 (to be described later) in accordance with the position where the focus lens is focused on an object image, which is transmitted from the camera control unit 101.

The diaphragm mechanism driving unit 203 includes a diaphragm driving actuator which drives a diaphragm mechanism (not shown) for adjusting the amount of light incident on the optical system 201. The lens control unit 202 receives, from the camera control unit 101, the diaphragm value of the diaphragm mechanism that is calculated by the AE/AF unit 108 to obtain an appropriate light receiving amount. The lens control unit 202 controls the diaphragm mechanism driving unit 203 to drive the diaphragm mechanism in accordance with the received diaphragm value of the diaphragm mechanism. The focus lens driving unit 204 includes a focus lens driving actuator which drives a focus lens (not shown) to focus on an object image. The lens control unit 202 receives, from the camera control unit 101, a position where the focus lens is focused on an object image, which is detected by the AE/AF unit 108. The lens control unit 202 controls the focus lens driving unit 204 to drive the focus lens in accordance with the received focus lens position. A camera shake correction driving unit 205 includes a camera shake correction actuator which drives the camera shake correction lens (not shown) of the optical system 201 in accordance with the camera shake amounts of the digital camera 100 and lens barrel 200 that are detected by a camera shake detection unit 206. More specifically, the camera shake correction driving unit 205 drives a camera shake correction lens to reduce the blur of an object image on the image sensor 102 that is caused by a camera shake. The camera shake detection unit 206 may be, for example, a sensor such as a gyro sensor capable of detecting the angles of the motions of the digital camera 100 and lens barrel 200. The camera shake detection unit 206 measures a camera shake amount upon image sensing, and transmits the measured camera shake amount to the lens control unit 202.

Figure 2A:
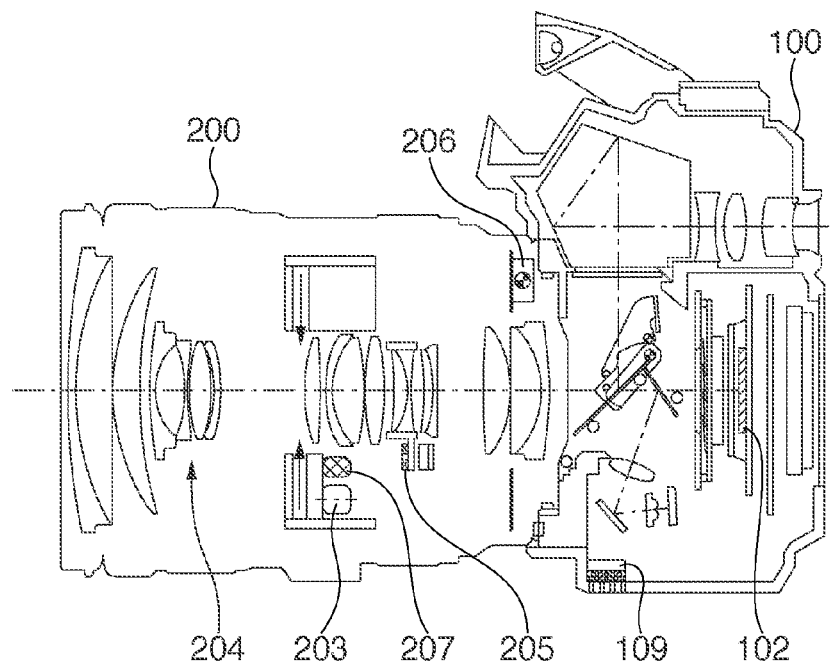
FIGS. 2A and 2B are views for explaining a noise source which moves within the lens barrel.
Figure 2B:
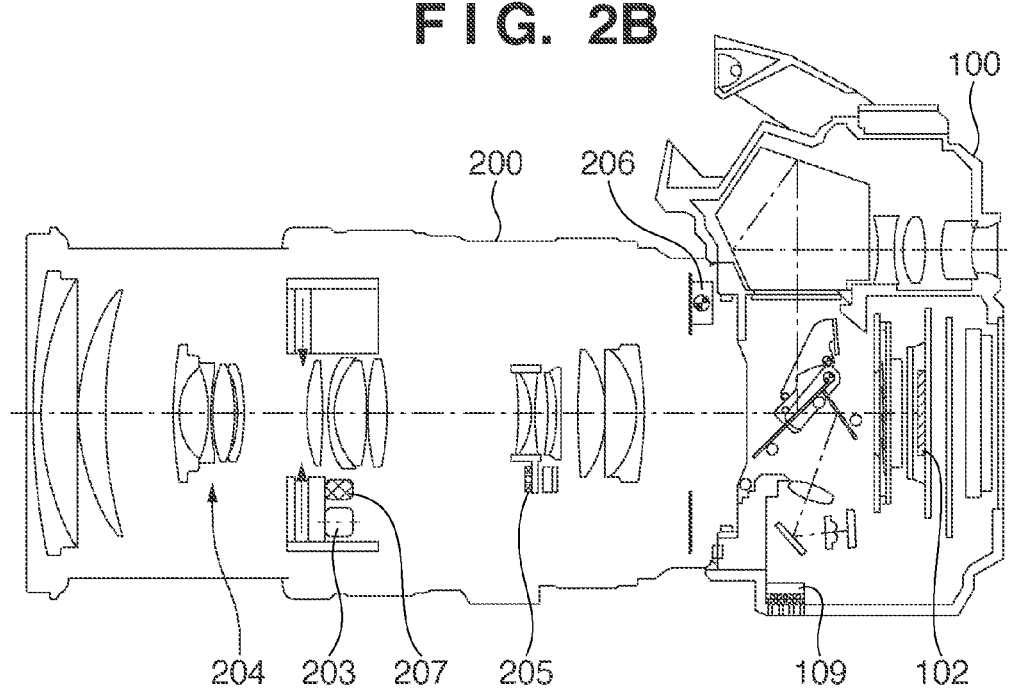

The noise microphone 207 is a sound collection microphone for collecting noise generated by a noise source which moves within the lens barrel 200. The noise microphone 207 outputs a signal to the sound processing unit 111 via the lens control unit 202 and camera control unit 101. In the embodiment, upon receiving an input from the user via the zoom button of the operation input unit 110 to change the angle of view, the optical system 201 changes the positional relationship between the lenses of the optical system 201 on the optical axis at the same as expansion and contraction of the lens barrel 200. FIGS. 2A and 2B are schematic views when the lens barrel 200 is connected to the digital camera 100.

FIG. 2A shows a case in which the user sets the lens barrel 200 to a wide angle of view. FIG. 2B shows a case in which the user sets the lens barrel 200 to a narrow angle of view. Depending on a set angle of view, the positional relationship between the lenses of the optical system 201 changes. That is, in the lens barrel 200, the focus lens and focus lens driving unit 204, the diaphragm mechanism and diaphragm mechanism driving unit 203, and the camera shake correction lens and camera shake correction driving unit 205 serve as noise sources which generate driving noise while moving to change the angle of view, focus, and diaphragm value. In the following description, these driving units having the three actuators will be handled as noise sources. The noise microphone 207 has a purpose of accurately acquiring noise generated by at least one of the moving noise sources regardless of the moving position of the noise source. For this purpose, the noise microphone 207 is fixed to a member which moves together with at least one noise source. The noise microphone 207 moves while maintaining a predetermined positional relationship with the noise source. In the embodiment, the noise microphone 207 is fixed to the same member as that of the diaphragm mechanism driving unit 203 in order to accurately acquire noise generated by the diaphragm mechanism driving unit 203 out of the driving units having the three actuators. However, the noise microphone 207 may be arranged on a member which moves together not with the diaphragm mechanism driving unit 203 but with another moving noise source. For example, in the embodiment, the noise microphone 207 may be arranged on a member which moves together not with the diaphragm mechanism driving unit 203 but with the focus lens driving unit 204 or camera shake correction driving unit 205.

In the above description, the microphone 109 and noise microphone 207 are sound collection microphones for acquiring an object sound and noise, respectively. However, each microphone does not acquire only a target sound. In other words, the microphone 109 aims at acquiring an object sound, but acquires even noise in addition to an object sound. Similarly, the noise microphone 207 aims at acquiring noise, but acquires even an object sound as well as noise.

Upon receiving an input from the user to the power button of the operation input unit 110 of the digital camera 100, the camera control unit 101 activates the digital camera 100. After the digital camera 100 is activated, the camera control unit 101 confirms, based on the energization state of the electrical contact, whether the lens barrel 200 is mounted. If the lens barrel 200 is mounted, the camera control unit 101 controls the image sensor 102 to photoelectrically convert an object image formed on the image sensor 102 via the optical system 201, and the A/D conversion unit 103 to A/D-convert the analog image, obtaining a digital image. Further, the camera control unit 101 controls the image processing unit 104 to apply various image processes to the digital image, and the image display unit 105 to display the resultant image. At this time, an image displayed in the display area of the image display unit 105 is one output upon a series of image sensing processes including photoelectrical conversion by the image sensor 102, A/D conversion by the A/D conversion unit 103, and image processes by the image processing unit 104. The camera control unit 101 displays (through-displays), on the image display unit 105, images sequentially output after image processes. In this state, the camera control unit 101 shifts the digital camera 100 to an image sensing standby state. Upon receiving an input from the user to the shutter button of the operation input unit 110, the camera control unit 101 performs an image sensing process and recording process. At the same time, the camera control unit 101 controls the AE/AF unit 108 to calculate, based on the digital image obtained by A/D conversion by the A/D conversion unit 103, information on the diaphragm value of the diaphragm mechanism and a position where the focus lens is focused on an object image. The camera control unit 101 transmits the information to the lens control unit 202. The lens control unit 202 controls the diaphragm mechanism driving unit 203 and focus lens driving unit 204 to drive the diaphragm mechanism and focus lens in accordance with the information, output from the camera control unit 101, on the diaphragm value of the diaphragm mechanism and the position where the focus lens is focused on an object image. Hence, the camera control unit 101 can present, on the image display unit 105, an image including an in-focus object image at a proper light receiving amount.

Figure 3:
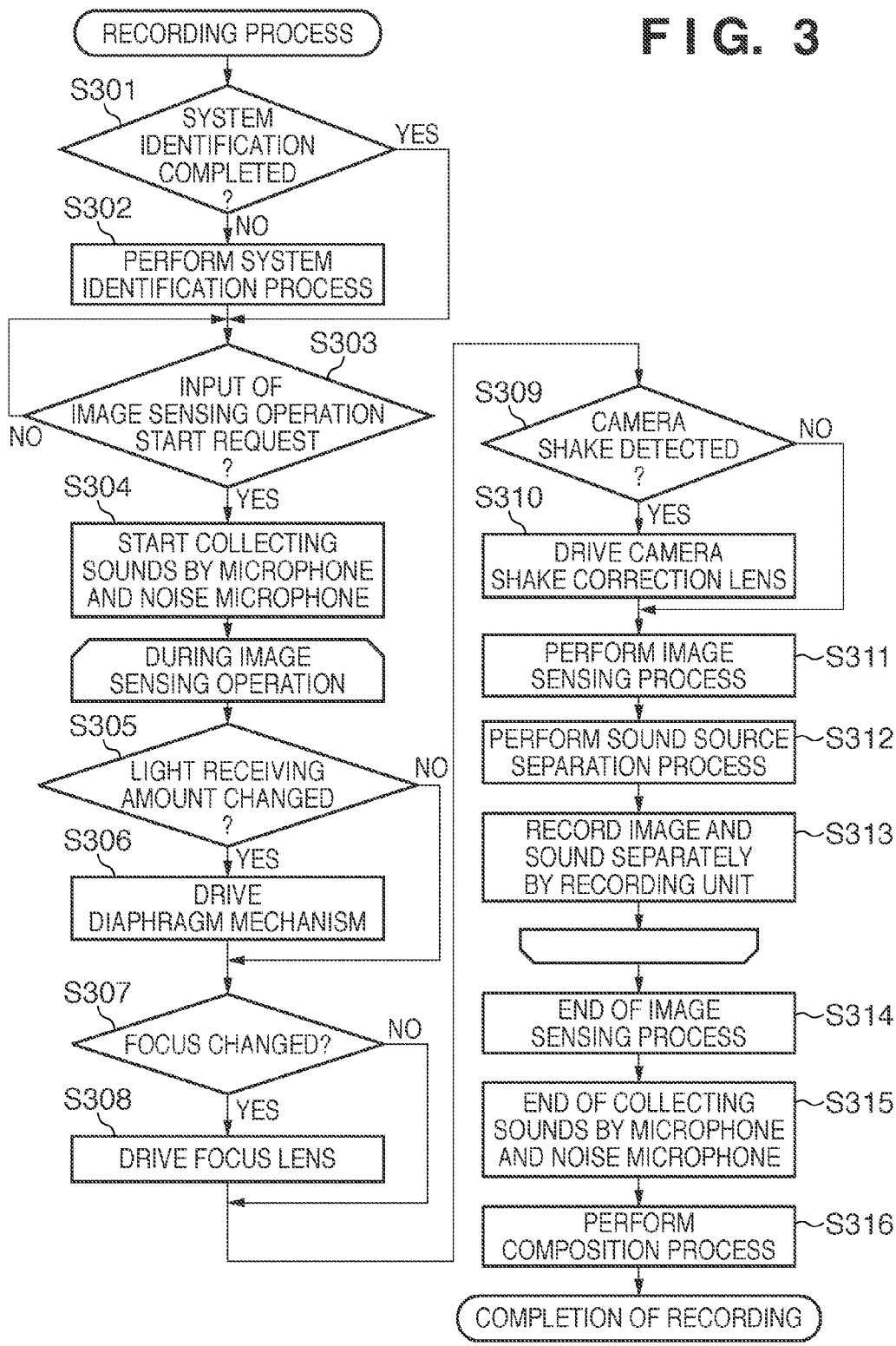
FIG. 3 is a flowchart for explaining a recording process in the image sensing apparatus.

A recording process in the digital camera and lens barrel having the above-described arrangements in the embodiment will be further explained with reference to the flowchart of FIG. 3. In the embodiment, a moving image containing a sound is recorded by an image sensing operation. However, the present invention is applicable to an image sensing apparatus which records a sound along with an image sensing operation, for example, records a sound in image sensing together with an image.

When the user activates the digital camera 100, the camera control unit 101 determines in S301 whether the lens barrel 200 is mounted on the digital camera 100 and a system identification process has been completed. Although details of the system identification process will be described later, by performing this process, the camera control unit 101 grasps the propagation characteristic of a sound from a noise source, which moves within the lens barrel 200, to the noise microphone 207 and that of a sound from the noise source to the microphone 109. If the camera control unit 101 determines in S301 that the system identification process has not been completed, it performs it in step S302. Upon completion of the system identification process, the camera control unit 101 starts a through display on the image display unit 105, sets the digital camera 100 in the image sensing standby state, and shifts the process to S303. If the camera control unit 101 determines in S301 that the system identification process has been completed, it starts a through display on the image display unit 105, sets the digital camera 100 in the image sensing standby state, and shifts the process to S303.

In S303, the camera control unit 101 determines whether it has received an input from the user via the shutter button of the operation input unit 110. If the camera control unit 101 has received an input from the user via the shutter button of the operation input unit 110, it starts an image sensing operation.

After the start of the image sensing operation in S303, the camera control unit 101 transmits, to the lens control unit 202, information on the diaphragm value of the diaphragm mechanism and a position where the focus lens is focused on an object image, which have been calculated by the AE/AF unit 108. In accordance with the obtained information on the diaphragm value of the diaphragm mechanism and the focus lens position, the lens control unit 202 controls the diaphragm mechanism driving unit 203 and focus lens driving unit 204 to drive the diaphragm mechanism and focus lens, respectively. Accordingly, the light receiving amount and focus of an object image formed on the image sensor 102 via the optical system 201 can be appropriately set. Then, the camera control unit 101 shifts the process to S304. If the camera control unit 101 determines in S303 that no image sensing operation start request has been input, it repeats the process of S303 as the image sensing standby state until the image sensing operation start request is input.

In S304, the camera control unit 101 controls the microphone 109 and the noise microphone 207 via the lens control unit 202 to start collecting sounds. At the same time, the camera control unit 101 changes the state of the digital camera 100 from the image sensing standby state to an image sensing operation state, starting an image sensing operation for recording. The camera control unit 101 repeats the processes of S305 to S313 till the completion of the image sensing operation. Upon completion of the image sensing operation, the camera control unit 101 determines, for example, an input from the user of the operation input unit 110, and performs an image sensing operation completion process.

In S305, the camera control unit 101 determines using the AE/AF unit 108 whether the amount of light received from the object is proper. For example, when a photometric value measured by the photometry sensor of the AE/AF unit 108 becomes different from a previous one, the camera control unit 101 determines that the light receiving amount has changed. Upon the change of the light receiving amount, the camera control unit 101 transmits, to the lens control unit 202, information on the diaphragm value of the diaphragm mechanism that has been calculated by the AE/AF unit 108. In accordance with the obtained information on the diaphragm value of the diaphragm mechanism, the lens control unit 202 controls the diaphragm mechanism driving unit 203 to drive the diaphragm mechanism (S306). If the camera control unit 101 determines in S305 that no light receiving amount has changed, it shifts the process to S307.

In S307, the camera control unit 101 determines using the AE/AF unit 108 whether the object image is in focus. More specifically, the camera control unit 101 determines whether the focus on the object image has changed owing to, for example, movement of the object or a change of the angle of view in response to an input from the user to the zoom button of the operation input unit 110. If the camera control unit 101 determines that the focus has changed, it transmits, to the lens control unit 202, information on a position where the focus lens is focused on the object image, which has been calculated by the AE/AF unit 108 from the contrast of the object image in the sensed image. In accordance with the obtained information on the position where the focus lens is focused on the object image, the lens control unit 202 controls the focus lens driving unit 204 to change the focus lens position (S308). If the camera control unit 101 determines in S307 that no focus has changed, it shifts the process to S309.

In S309, the lens control unit 202 determines whether the camera shake detection unit 206 has detected a camera shake, and notifies the camera control unit 101 of the presence/absence of a camera shake. If a camera shake has been detected, the camera control unit 101 controls the camera shake correction driving unit 205 via the lens control unit 202 to drive the camera shake correction lens so as to cancel out an object image blur caused by the camera shake in accordance with the information on the camera shake amount obtained from the camera shake detection unit 206 (S310). If the lens control unit 202 determines in S309 that no camera shake has been detected, the camera control unit 101 shifts the process to S311.

In S311, the camera control unit 101 photoelectrically converts the object image formed on the image sensor 102, and controls the A/D conversion unit 103 to A/D-convert the obtained analog image signal, and the image processing unit 104 to apply a variety of image processes to the obtained digital image data.

In S312, the camera control unit 101 controls the sound processing unit 111 to apply a sound source separation process to a sound acquired by the microphone 109 and that acquired by the noise microphone 207 during the image sensing process. Although details of the sound source separation process will be described later, this process separates sound sources based on the propagation characteristics of a sound from the noise source to the microphone 109 and noise microphone 207 that are derived by the system identification process, and sounds acquired by the respective microphones. That is, the sound source separation process can eliminate the influence of the propagation path, generating a sound by reducing noise generated by the noise source from the sound acquired by the microphone 109.

In S313, the camera control unit 101 records, in respective areas by the recording unit 106, the image obtained by the image sensing process of S311, and the sound generated by reducing noise from the sound acquired by the microphone 109 in the sound source separation process of S312.

If the camera control unit 101 detects, for example, an input from the user to the shutter button of the operation input unit 110 during the image sensing operation, it ends the image sensing process (S314). At the same time, the camera control unit 101 controls the microphone 109 and the noise microphone 207 via the lens control unit 202 to end the sound collection (S315). The camera control unit 101 composites one or a plurality of images and the sound which have been recorded separately by the recording unit 106. Then, the camera control unit 101 outputs a moving image, completing the recording process.

Figure 4A:
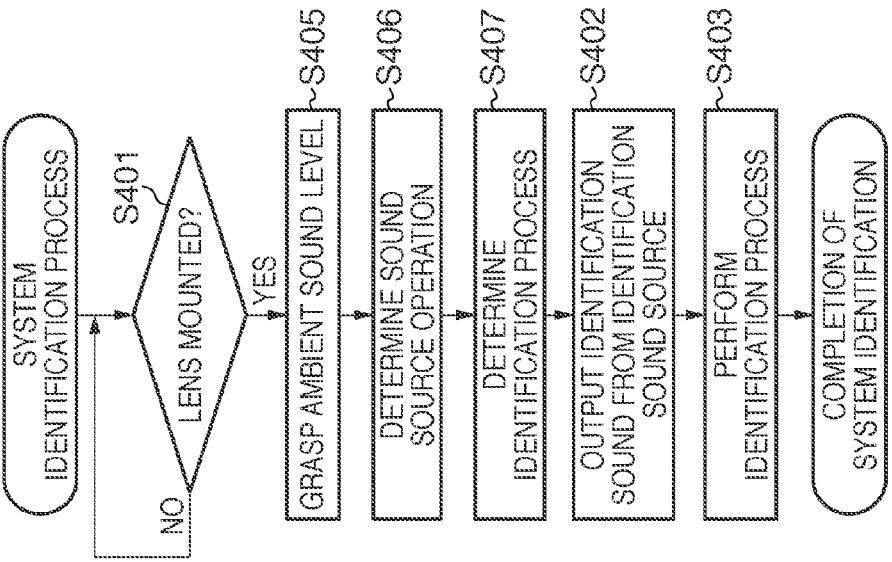
FIGS. 4A, 4B, and 4C are flowcharts for explaining a system identification process by the image sensing apparatus.

The system identification process in the embodiment will be explained in detail with reference to the flowcharts of FIGS. 4A to 4C. FIG. 4A is a flowchart showing the sequence of a basic system identification process.

In S401, the camera control unit 101 determines whether the lens barrel 200 is mounted on the digital camera 100. The camera control unit 101 repeats the process of S401 until the lens barrel 200 is mounted. If the camera control unit 101 determines that the lens barrel 200 is mounted, it shifts the process to S402.

In S402, the camera control unit 101 generates an identification sound in order to measure the propagation characteristic of a sound from the noise source (diaphragm mechanism driving unit 203, focus lens driving unit 204, or camera shake correction driving unit 205) in the lens barrel 200 to the noise microphone 207. In the embodiment, the noise microphone 207 is fixed to a member which moves together with the diaphragm mechanism driving unit 203. The identification sound needs to be generated by the diaphragm mechanism driving unit 203 serving as the noise source whose noise is to be acquired. Thus, the camera control unit 101 drives the diaphragm mechanism driving unit 203 via the lens control unit 202, generating an identification sound.

The diaphragm mechanism driving unit 203 is caused to generate a sound as follows. The diaphragm mechanism generally has a switch for detecting the opening of diaphragm blades. When the diaphragm mechanism driving unit 203 drives the diaphragm blades in the opening direction, the diaphragm mechanism driving unit 203 monitors an output from the switch for detecting the opening of the diaphragm blades, and performs deceleration control of the diaphragm driving actuator and the like. When the diaphragm mechanism driving unit 203 is used as an identification sound source, for example, the diaphragm blades are driven in the opening direction so that the diaphragm driving actuator is driven up to a mechanical stopper while ignoring an output from the switch for detecting the opening of the diaphragm blades. When the diaphragm driving actuator is driven up to the mechanical stopper, it stops, and a sound at a level high enough as an identification sound is generated. This sound is used as an identification sound.

In the embodiment, the diaphragm mechanism driving unit 203 is used as an identification sound source. However, the identification sound source suffices to be a moving noise source whose noise is to be acquired. In other words, it suffices to generate an identification sound from a noise source on a member to which the noise microphone 207 is fixed. For example, when the focus lens driving unit 204 and camera shake correction driving unit 205 are used as identification sound sources, sounds generated by the focus lens driving actuator and camera shake correction actuator are used.

For example, when there are a plurality of moving noise sources, like the embodiment, and noise microphones 207 are fixed to respective members which move together with the moving noise sources, an identification process using one of the noise microphones 207 may be executed as follows. More specifically, when the lens ROM 208 stores information indicating which actuator is used as an identification sound source, the lens control unit 202 acquires information on the actuator used as an identification sound source, and an identification sound is generated from the identification sound source. Alternatively, a noise source capable of accurately identifying a signal which most affects a sound signal in image sensing may be determined from the lens state, and an identification sound may be generated from this noise source.

In S403, the camera control unit 101 controls the sound processing unit 111 to perform the identification process using identification sounds respectively collected by the microphone 109 and noise microphone 207. This identification process can obtain the propagation characteristics of a sound from the noise source to the microphone 109 and noise microphone 207, which are necessary in the sound source separation process. For example, when the identification sound is an impulse sound, the sound processing unit 111 applies a fast Fourier transform (FFT) process to respective identification sounds collected by the microphone 109 and noise microphone 207. From information on the sounds having performed the FFT process, the sound processing unit 111 can obtain the propagation characteristic of a sound from the noise source to the microphone 109 and that of a sound from the noise source to the noise microphone 207. For the sound source separation process, the sound processing unit 111 stores the respective obtained propagation characteristics in the filter coefficient memory (not shown) of the sound processing unit 111.

A method of obtaining the propagation characteristic of a sound from the noise source to the microphone 109 and that of a sound from the noise source to the noise microphone 207 in the system identification process will be described in more detail. The method of obtaining a propagation characteristic changes, depending on the type of identification sound generated by the noise source. More specifically, the sound processing unit 111 changes the process depending on whether the identification sound generated by the noise source is an impulse sound. Note that information indicating whether the identification sound generated by the identification sound source is an impulse sound needs to be stored in the lens ROM 208 in, for example, shipment of the lens barrel 200 from the factory. When executing the system identification process, the lens control unit 202 reads out, from the lens ROM 208, the information indicating whether the identification sound is an impulse sound, and transmits it to the camera control unit 101.

When identification sounds are or are regarded as impulse sounds, they have waveform components which exhibit a uniform sound pressure from a low frequency to high one and are in phase, as shown in FIG. 5A. In the system identification process, fast Fourier transform is performed for identification sounds respectively collected by the microphone 109 and noise microphone 207, obtaining frequency characteristics. If the obtained frequency characteristics have a sound pressure difference between frequencies or are out of phase, the cause of this resides in the propagation path. That is, when identification sounds are impulse sounds, frequency characteristics obtained by performing fast Fourier transform for identification sounds respectively collected by the microphone 109 and noise microphone 207 have only information on the propagation path, and thus can be directly used as propagation characteristics.

If identification sounds are not impulse sounds, they have waveform components which exhibit a nonuniform sound pressure at respective frequencies and are out of phase, as shown in FIG. 5B, unlike impulse identification sounds. In the system identification process, frequency characteristics obtained by performing fast Fourier transform for identification sounds respectively collected by the microphone 109 and noise microphone 207 contain the frequency characteristics of the identification sounds and those dependent on the propagation path. In other words, as long as the frequency characteristic of the identification sound is known, propagation characteristics can be obtained by subtracting the frequency characteristic of the identification sound from those of identification sounds respectively collected by the microphone 109 and noise microphone 207. To obtain the frequency characteristic of the identification sound, for example, the information on the identification sound waveform is stored in the lens ROM 208 in shipment of the lens barrel 200 from the factory, together with information indicating that the identification sound is not an impulse sound. In the system identification process, the lens control unit 202 reads information on the identification sound waveform from the lens ROM 208, and transmits it to the sound processing unit 111 via the camera control unit 101, executing the FFT process.

Figure 4B:
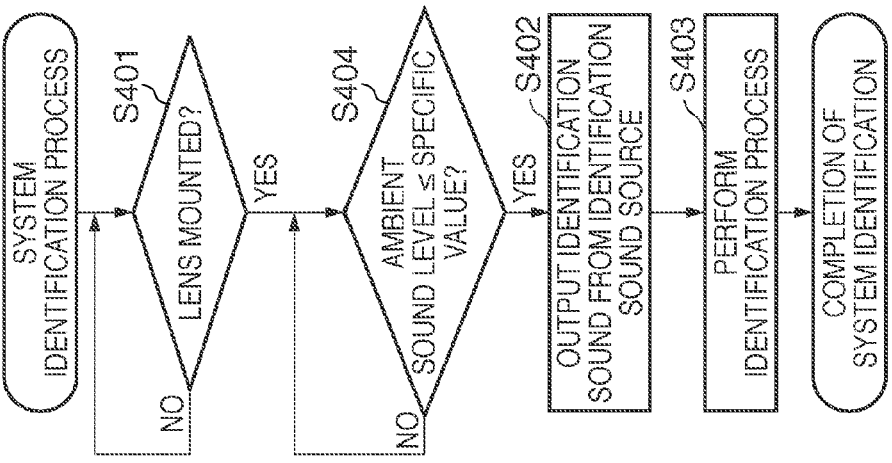

FIG. 4B is a flowchart showing the sequence of another method of the system identification process. In this flowchart, the same step numbers as those in the flowchart of the above-described basic system identification process denote the same processes, and a description thereof will not be repeated. The processes of characteristic steps of this flowchart will be explained.

If the camera control unit 101 detects in S401 that the lens barrel 200 is mounted on the digital camera 100, it determines using the microphone 109 or noise microphone 207 in S404 whether the ambient sound level is equal to or a lower than a specific value. More specifically, the camera control unit 101 determines whether the environment where the identification sound is generated is at an ambient sound level at which the identification sound can be satisfactorily collected. The camera control unit 101 determines whether the level of an ambient sound collected by, for example, the microphone 109 is equal to or lower than the specific value of the ambient sound level that is stored in the camera ROM 107. At this time, if the level of an ambient sound collected by the microphone 109 is higher than the specific value, the camera control unit 101 repeats S404 until the level of an ambient sound collected by the microphone 109 becomes equal to or lower than the specific value. If the level of an ambient sound collected by the microphone 109 becomes equal to or lower than the specific value, the camera control unit 101 shifts the process to S402 to request the lens control unit 202 to output an identification sound.

Figure 4C:
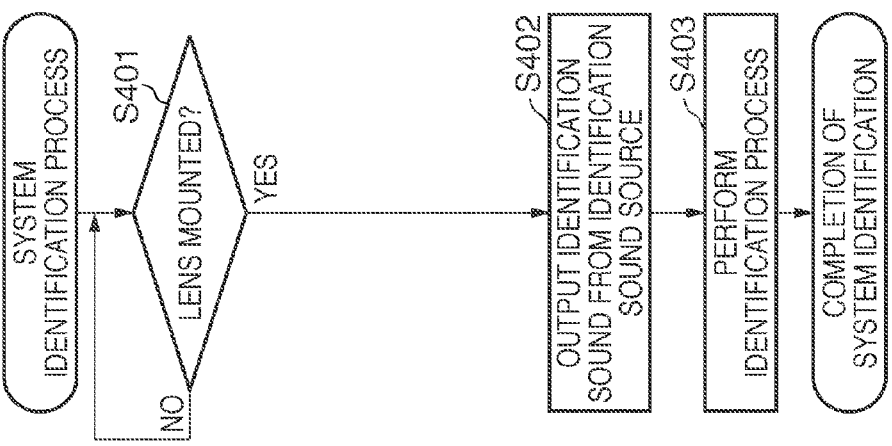

FIG. 4C is a flowchart showing the sequence of still another method of the system identification process. In this flowchart, the same step numbers as those in the flowchart of the above-described basic system identification process denote the same processes, and a description thereof will not be repeated. The processes of characteristic steps of this flowchart will be explained.

If the camera control unit 101 detects in S401 that the lens barrel 200 is mounted on the digital camera 100, it measures an ambient sound level using the microphone 109 or noise microphone 207 in S405. The ambient sound level measured by the camera control unit 101 may be classified into two, high and low ranks based on the threshold of the ambient sound level that is stored in, for example, the camera ROM 107, or classified into more ranks.

In S406, the camera control unit 101 instructs the lens control unit 202 about an identification sound source operation method suited to the rank of the ambient sound level. For example, when the ambient sound level is high and the S/N ratio of identification sounds collected by the microphone 109 and noise microphone 207 in the identification process and the ambient sound is expected to decrease, the camera control unit 101 instructs the lens control unit 202 to generate an identification sound by a plurality of number of times.

In S407, the camera control unit 101 instructs the sound processing unit 111 about a system identification processing method corresponding to an identification sound source operation suited to the rank of the ambient sound level that has been designated to the lens control unit 202. Then, the camera control unit 101 shifts the process to S402. For example, when the ambient sound level is high and the identification sound is generated by a plurality of number of times, the camera control unit 101 instructs the sound processing unit 111 about the following operation. The camera control unit 101 instructs the sound processing unit 111 to execute the identification process by a plurality of number of times for a plurality of generated identification sounds, average a plurality of obtained propagation characteristics, and determine the propagation characteristic. Even if the ambient sound level measured in S405 is high, the ambient sound level may change during a plurality of identification processes. Hence, averaging the results of a plurality of identification processes can improve the identification precision, compared to a propagation characteristic obtained at a low S/N ratio.

Although not described using a flowchart, when the ambient sound level is high, for example, a propagation characteristic obtained by the system identification process executed when the lens barrel 200 was mounted on the digital camera 100 in the past may be used without performing the system identification process this time. In this case, the following process is performed upon completion of the system identification process when the lens barrel 200 was mounted on the digital camera 100 in the past. For example, the camera control unit 101 reads out, from the filter coefficient memory of the sound processing unit 111, information on the propagation characteristics of a sound from the moving noise source in the lens barrel 200 to the microphone 109 and noise microphone 207, and transmits them to the lens control unit 202. The lens control unit 202 stores, in the lens ROM 208, the transmitted information on the propagation characteristics of a sound from the noise source to the microphone 109 and noise microphone 207, together with information indicating that the system identification process with the digital camera 100 has been executed. Thus, when the ambient sound level is high and the system identification process has already been done between the digital camera 100 and the lens barrel 200, the camera control unit 101 need not perform the system identification process. The camera control unit 101 suffices to read out, via the lens control unit 202, the propagation characteristics stored in the lens ROM 208 and transmit them to the filter coefficient memory of the sound processing unit 111.

Note that the system identification process in the embodiment has been described assuming a case in which the lens barrel 200 is detachable and incorporates the moving noise source. However, when the present invention is applied to a digital camera which does not require mounting of the lens barrel, whether the lens barrel is mounted need not be determined in the system identification process. It suffices to perform the system identification process immediately before the digital camera shifts to the image sensing standby state. It is also possible to perform the system identification process in shipment of the digital camera from the factory, and store the resultant propagation characteristics in advance in, for example, the ROM of the digital camera.

Figure 6:
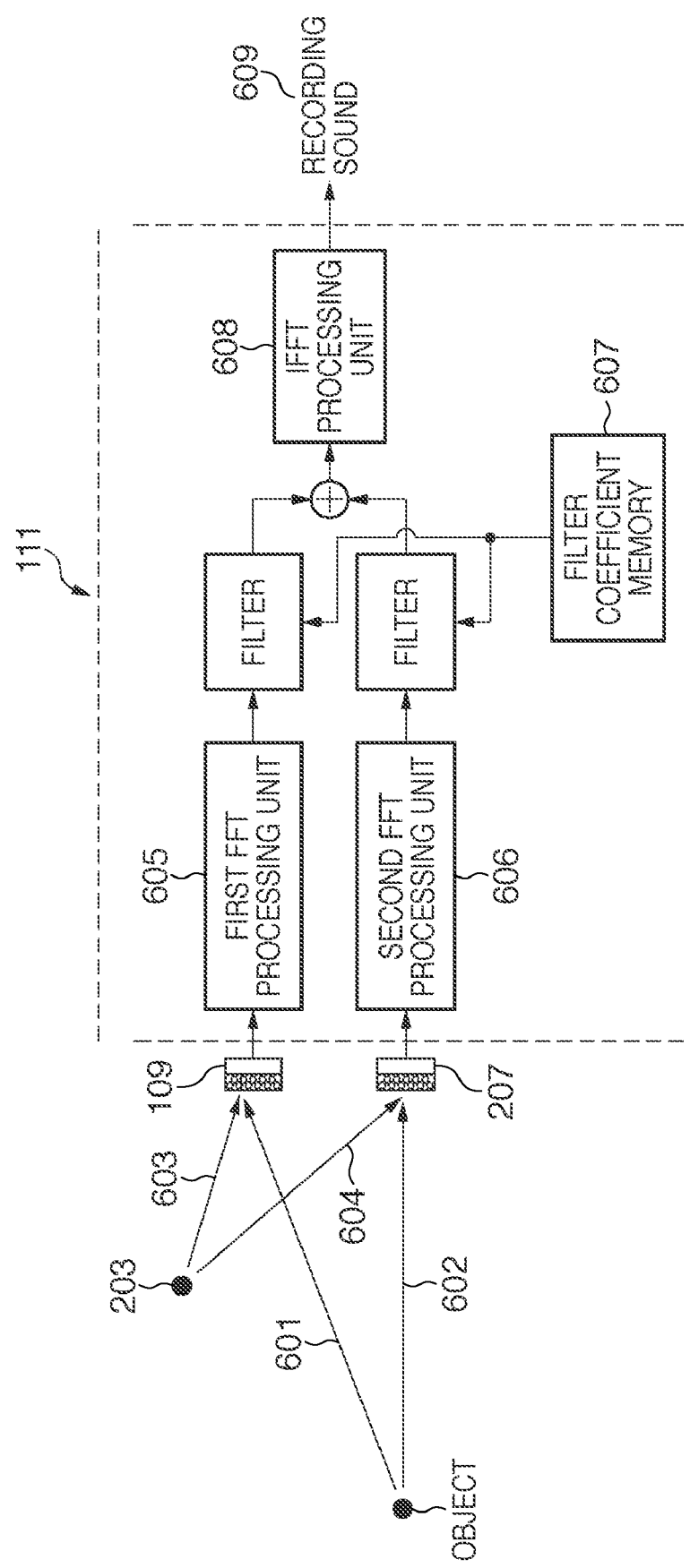
FIG. 6 is a diagram for explaining a sound source separation process.

The sound source separation process in the embodiment will be described in detail with reference to FIG. 6. FIG. 6 is a diagram showing a sound processing circuit serving as the sound processing unit 111. The sound processing circuit has two input systems for information on noise generated by the noise source (diaphragm mechanism driving unit 203) and an object sound which are acquired by the noise microphone 207 and microphone 109.

Sounds which are acquired by the microphone 109 and noise microphone 207 and input to the sound processing circuit are input to a first FFT processing unit 605 and second FFT processing unit 606, and perform a fast Fourier transform process. The sound source separation process is done using the propagation characteristics of a sound from the noise source to the microphone 109 and noise microphone 207 that have been derived by the system identification process, and those of a sound from the object to the microphone 109 and noise microphone 207. These propagation characteristics are stored in the filter coefficient memory. An IFFT processing unit 608 performs inverse Fourier transform for the results of the sound source separation process, obtaining information on sounds respectively generated by the object and noise source.

The basic principle of the sound source separation process will be explained using one sound source and one microphone. In this example, attention is paid to an object as one sound source, and the microphone 109 collects the object sound. When the sound source is only the object, a sound acquired by the microphone 109 is one obtained by superimposing the influence of a propagation path 601 on the object sound. This is expressed by $$y(t)=\int a(\tau)x(t-\tau)d\tau \quad (1)$$

where y(t) is a sound acquired by the microphone 109, a is the propagation characteristic of the propagation path 601, and x(t) is a sound generated by the object. As represented by equation (1), the acquired sound y(t) is given by the convolution integral of the sound x(t) of the object serving as a sound source and the propagation characteristic a. As is apparent from equation (1), if a is known, x(t) can be obtained from y(t). However, it is not easy to reconstruct the convolution integral signal in the time domain. For this reason, the first FFT processing unit applies fast Fourier transform. At this time, the sound signal is converted into information in the frequency domain which is given by $$Y(\omega)=A(\omega)X(\omega) \quad (2)$$

where Y(ω), A(ω), and X(ω) are the results of Fourier transform of y(t), a, and x(t), respectively. As is apparent from the convolution theorem, a convolution integral sound signal in the time domain can be expressed by a simple integral in the frequency domain. Rewriting equation (2) yields $$X(\omega) = \frac{Y(\omega)}{A(\omega)} \quad (3)$$

$X(\omega)$ is inversely Fourier-transformed to return to the time domain again, obtaining a sound generated by the object that is free from the influence of the propagation path 601.

A case in which the sound source separation process is done for two sound sources and two microphones in the embodiment by applying this basic principle will be explained. The foregoing equation (1) can be expanded even for two sound sources and two microphones:

$$\begin{pmatrix} y_1(t) \\ y_2(t) \end{pmatrix} = \begin{pmatrix} a_{11} & a_{12} \\ a_{21} & a_{22} \end{pmatrix} * \begin{pmatrix} x_1(t) \\ x_2(t) \end{pmatrix} \quad (4)$$

where * is a convolution integral, $y_1(t)$ is a sound acquired by the microphone 109, $y_2(t)$ is a sound acquired by the noise microphone 207, $x_1(t)$ is a sound generated by the object, $x_2(t)$ is a sound generated by the diaphragm mechanism driving unit 203 serving as a noise source, and $a_{11}$, $a_{12}$, $a_{21}$, and $a_{22}$ are the propagation characteristics of the propagation path 601, and propagation paths 603, 602, and 604, respectively. Applying Fourier transform to the determinant of equation (4) yields an equation equivalent to equation (2). Even for two sound sources and two microphones, the equation is similarly rewritten, obtaining sound signals free from the influence of the propagation path.

As is apparent from equation (4), $A(\omega)$ is not a scalar, so an equation equivalent to equation (3) is $$X(\omega) = (A^*(\omega)A(\omega))^{-1} A^*(\omega) Y(\omega) \quad (5)$$

where $A^*(\omega)$ is the adjoint matrix of $A(\omega)$. In many cases, $A^*(\omega)A(\omega)$ is a positive value Hermitian matrix and has an inverse matrix, as represented by equation (5), so $X(\omega)$ can be obtained. By applying inverse Fourier transform to $X(\omega)$ to return to the time domain, the influences of the propagation paths 601, 602, 603, and 604 can be eliminated to separate and obtain a sound generated by the object serving as a sound source and that generated by the noise source.

Note that the embodiment employs "independent component analysis (ICA)" which is a kind of multivariant analysis among various "sound source separation" methods. By using the ICA method, the propagation characteristics $a_{11}$, $a_{12}$, $a_{21}$, and $a_{22}$ in equation (4) can be derived. More specifically, assuming that the sounds $x_1(t)$ and $x_2(t)$ are independently generated, $a_{11}$, $a_{12}$, $a_{21}$, and $a_{22}$ in equation (4) are obtained from the sound $y_1(t)$ acquired by the microphone 109 and the sound $y_2(t)$ acquired by the noise microphone 207.

As described above, the image sensing apparatus according to the embodiment records a sound along with an image sensing operation. For this purpose, the first sound collection microphone is arranged to acquire an object sound. Further, to acquire noise generated by a moving noise source within the lens barrel mounted on the image sensing apparatus, without the influence of movement, the second sound collection microphone for acquiring noise is arranged on a member which moves together with the moving noise source. Before performing the image sensing operation, the moving noise source is caused to generate an identification sound, and the system identification process is executed, in order to acquire the propagation characteristics of propagation paths when noise generated by the moving noise source is input to the first and second sound collection microphones. With this arrangement, the propagation characteristic of a sound from the noise source to the second sound collection microphone hardly changes. Thus, the image sensing apparatus according to the embodiment can reduce the calculation amount in the noise reduction process. The distance between the first sound collection microphone and the noise source is longer than that between the second sound collection microphone and the noise source. Since a change of the propagation characteristic along with the movement of the noise source can be regarded to be negligibly small, further reduction of the calculation amount can be expected.

In the image sensing operation, an object sound and noise from the moving noise source are acquired using the first and second sound collection microphones when recording a sound. The sound source separation process is executed using signals output from the first and second sound collection microphones and the propagation characteristics of the first and second sound collection microphones for the object and noise source. As a result, noise of the moving noise source can be reduced from a sound signal acquired by the first sound collection microphone.

In the embodiment, the detachable lens barrel incorporates the moving noise source. However, in an image sensing apparatus having a built-in lens, like a retractable lens barrel, it suffices to arrange the second sound collection microphone on a member which moves together with the moving noise source in the retractable lens inside the image sensing apparatus. It suffices that the second sound collection microphone in the present invention is arranged within the image sensing apparatus regardless of the presence/absence of the detachable lens barrel, and can acquire noise on a member which moves together with a noise source that generates noise while moving.

Modification

Figure 7A:
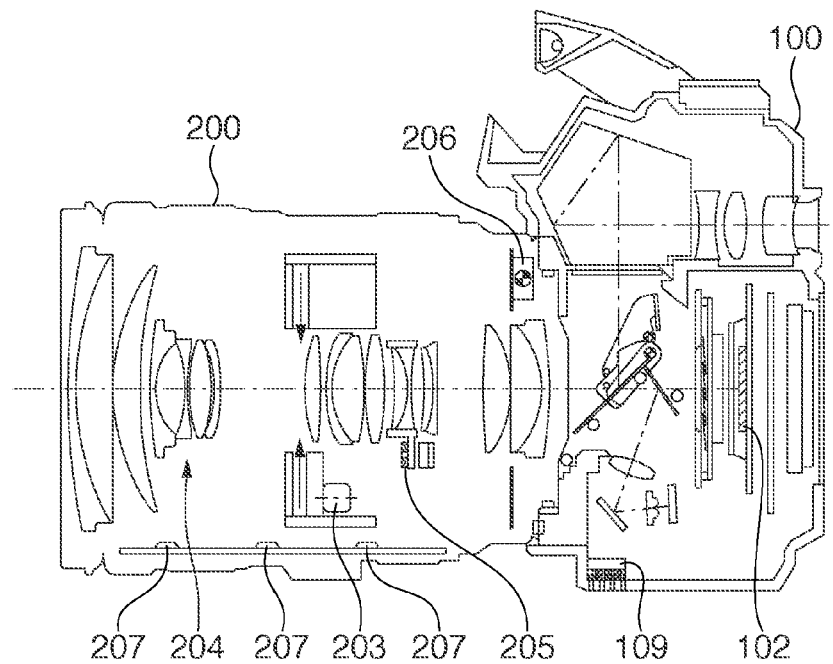
FIGS. 7A and 7B are views for explaining an image sensing apparatus and lens barrel according to a modification of the embodiment.
Figure 7B:
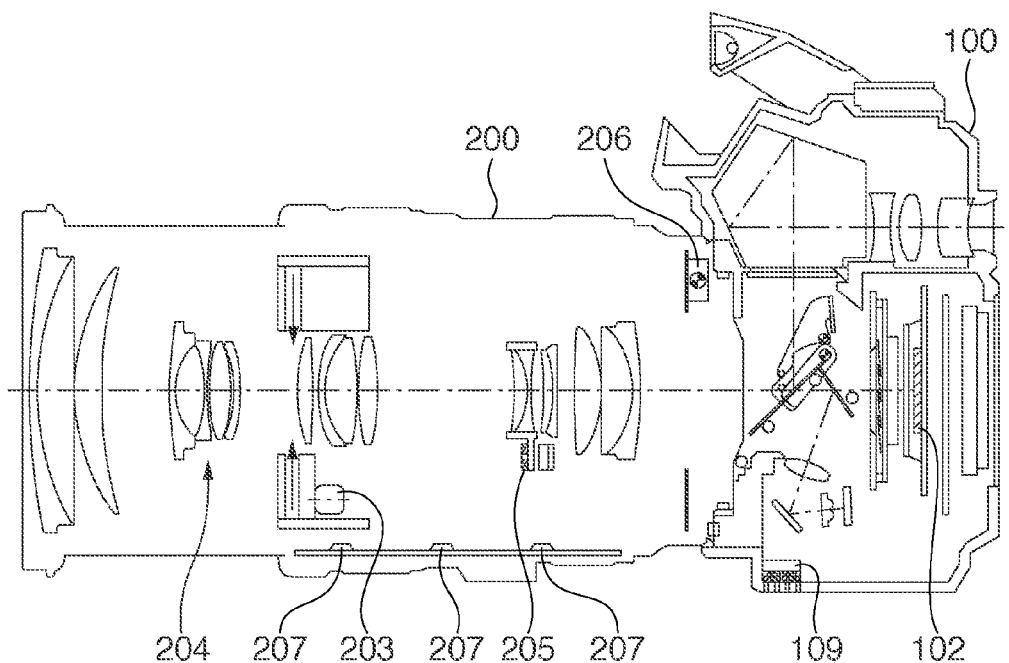

In the above-described embodiment, the noise microphone 207 is arranged on a member that moves together with the moving noise source, in order to acquire noise generated by the moving noise source without the influence of movement. In this modification, a plurality of noise microphones 207 are linearly arranged not on a member which moves together with the moving noise source, but at, for example, the bottom inside the lens barrel 200 at equal intervals in a range where the moving noise source moves, as shown in FIGS. 7A and 7B. The lens control unit 202 selects one of the arranged noise microphones 207, and the selected noise microphone 207 acquires noise generated by the moving noise source.

For example, the following process is done to accurately acquire, by the noise microphone 207, noise generated by the diaphragm mechanism driving unit 203 without the influence of movement.

In S302, the camera control unit 101 performs the system identification process. At this time, when the diaphragm mechanism driving unit 203 generates an identification sound, the lens control unit 202 selects a noise microphone 207 closest to the position of the diaphragm mechanism driving unit 203 as a microphone used for the system identification process. Then, the system identification process is done. When not the diaphragm mechanism driving unit 203 but, for example, the focus lens driving unit 204 generates an identification sound, the following processing is executed. More specifically, the lens control unit 202 selects, as a microphone used for the system identification process, a noise microphone 207 closest to the moving position of the focus lens driving unit 204 which generates an identification sound.

A case in which the angle of view is changed during the image sensing operation when the camera control unit 101 shifts the process to the image sensing operation upon completion of the system identification process will be examined. Upon accepting an input from the user to the zoom button of the operation input unit 110, the camera control unit 101 transmits information on the changed angle of view to the lens control unit 202. In accordance with the received information on the changed angle of view, the lens control unit 202 drives the optical system 201 to change the positional relationship of the optical system 201. When the positional relationship of the optical system 201 changes, the position of the diaphragm mechanism driving unit 203 is also changed in the lens barrel 200. At this time, the lens control unit 202 calculates the position of the diaphragm mechanism driving unit 203 from the changed angle of view, and selects one of the noise microphones 207 that is close to the position of the diaphragm mechanism driving unit 203 upon movement. The output signal of the noise microphone 207 that is transmitted from the noise microphone 207 to the sound processing unit 111 is switched to an output from a different noise microphone 207 (close to the diaphragm mechanism driving unit 203) in response to an input along with the movement of the noise source. Accordingly, noise generated by the moving noise source can be acquired with an almost constant positional relationship without arranging the noise microphone 207 on a member which moves together with the moving noise source.

This modification is effective when, for example, the moving noise source is small and a space for arranging the noise microphone 207 cannot be ensured on a member which moves together with the moving noise source.

As described above, the image sensing apparatus in the modification records a sound along with an image sensing operation. For this purpose, the first sound collection microphone is arranged to acquire an object sound. Also, to acquire noise generated by a moving noise source within the lens barrel mounted on the image sensing apparatus, without the influence of movement, a plurality of second sound collection microphones for acquiring noise are arranged at, for example, equal intervals within the movable range of the moving noise source. In accordance with the moving position of the moving noise source, the second sound collection microphone is switched to one close to the moving position, and acquires noise. Similar to the above-described embodiment, noise from the moving noise source can be reduced from a sound signal acquired by the first sound collection microphone.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-214979, filed Sep. 16, 2009, which is hereby incorporated by reference herein in its entirety.

What is claimed is:

1. An image sensing apparatus comprising:
    an image sensing unit that generates an image signal from an optical image of an object;
    a lens unit that forms the optical image of the object on said image sensing unit, where said lens unit can drive a lens of said lens unit;
    a first microphone unit that acquires a first sound signal by sound collection in order to collect an ambient sound;
    a second microphone unit that acquires a second sound signal by sound collection in order to collect noise generated upon driving the lens; and
    a noise reduction processing circuit that reduces, from the first sound signal based on the first sound signal and the second sound signal, influence of the noise generated upon driving the lens,
    wherein said second microphone unit is arranged at a position where a relative positional relationship with the lens does not change even if the lens is driven.

2. The apparatus according to claim 1, wherein said second microphone unit is fixed to the same member as a member of the lens.

3. The apparatus according to claim 1, wherein said lens unit drives a diaphragm mechanism of said lens unit; and
    said second microphone unit is fixed to the same member as a member of the diaphragm mechanism.

4. The apparatus according to claim 1, wherein the lens includes at least one of a focus lens, a camera shake correction lens, and a zoom lens.

5. The apparatus according to claim 1, wherein a coefficient used in a process by said noise reduction processing circuit is acquired when said lens unit is mounted.

6. The apparatus according to claim 5, wherein the lens is driven when acquiring the coefficient used in the process by said noise reduction processing circuit.

7. The apparatus according to claim 1, wherein a coefficient used in a process by said noise reduction processing circuit is acquired when said lens unit is mounted and a level of a sound represented by the first sound signal is not higher than a predetermined value.

8. An image sensing system comprising an image sensing apparatus and a lens unit,
    said image sensing apparatus comprising:
        an image sensing unit adapted to generate an image signal from an optical image of an object; and
        a first microphone unit adapted to acquire a first sound signal by sound collection in order to collect an ambient sound,
    said lens unit comprising:
        a lens adapted to form the optical image of the object on said image sensing unit of said image sensing apparatus;
        a diaphragm mechanism adapted to adjust a light receiving amount of said image sensing unit, where said lens and said diaphragm mechanism are driven in accordance with an instruction from said image sensing apparatus; and
        a second microphone unit adapted to acquire a second sound signal by sound collection in order to collect noise generated upon driving at least one of said lens and said diaphragm mechanism, and
    said image sensing apparatus further comprising:
        a noise reduction processing circuit configured to reduce, from the first sound signal based on the first sound signal and the second sound signal, influence of the noise generated upon driving at least one of said lens and said diaphragm mechanism of said lens unit,
    wherein said second microphone unit is arranged at a position where a relative positional relationship with at least one generation source of noise generated upon driving at least one of said lens and said diaphragm mechanism does not change even if at least one of said lens and said diaphragm mechanism of said lens unit is driven.

9. The system according to claim 8, wherein said second microphone unit is fixed to the same member as a member of said at least one generation source of noise generated upon driving at least one of said lens and said diaphragm mechanism.

10. The system according to claim 8, wherein said second microphone unit is fixed to the same member as a member of at least one of said lens and said diaphragm mechanism.

11. The system according to claim 8, wherein said lens includes at least one of a focus lens, a camera shake correction lens, and a zoom lens.

12. The system according to claim 8, wherein the lens includes at least one of a focus lens, a camera shake correction lens, and a zoom lens.

13. An image sensing system comprising an image sensing apparatus and a lens unit,
said image sensing apparatus comprising:
an image sensing unit adapted to generate an image signal from an optical image of an object; and
a first microphone unit adapted to acquire a first sound signal by sound collection in order to collect an ambient sound,
said lens unit comprising:
a lens adapted to form the optical image of the object on said image sensing unit of said image sensing apparatus; and
a second microphone unit adapted to acquire a second sound signal by sound collection in order to collect noise generated upon driving the lens, and
said image sensing apparatus further comprising:
a noise reduction processing circuit adapted to reduce, from the first sound signal based on the first sound signal and the second sound signal, influence of the noise generated upon driving the lens,
wherein said second microphone unit is arranged at a position where a relative positional relationship with the lens does not change even if the lens is driven.

14. The system according to claim 13, wherein said second microphone unit is fixed to the same member as a member of the lens.

15. The system according to claim 13, wherein said lens unit further comprising a diaphragm mechanism, and
said second microphone unit is fixed to the same member as a member of the diaphragm mechanism.

16. An audio processing system comprising an audio processing apparatus and a driving apparatus,
said audio processing apparatus comprising:
a first microphone unit that obtains a first audio signal; and
an audio processor that processes the first audio signal;
said driving apparatus comprising:
a driven unit that moves position in association with driving; and
a second microphone unit that obtains a second audio signal;
wherein said audio processor reduces, from the first audio signal based on the first audio signal and the second audio signal, influence of the noise generated upon driving said driven unit, and
said second microphone unit is arranged at a position where a relative position relationship with said driven unit does not change even if said driven unit is moved.

17. The system according to claim 16, wherein the second microphone is fixed to the same member as a member of said driven unit.

18. The system according to claim 16, wherein said driven unit includes a lens unit.

19. The system according to claim 16, wherein said driven unit includes a diaphragm mechanism.

20. The system according to claim 16, wherein said audio processor detects a propagation characteristic of the noise generated upon driving the driven unit to said first microphone unit.

21. The system according to claim 20, wherein said audio processor reduces the first audio signal based on the detected propagation characteristic.

22. An audio processing apparatus comprising:
a first microphone unit that obtains a first audio signal;
an audio processor that processes the first audio signal;
a driven unit that moves position in association with driving; and
a second microphone unit that obtains a second audio signal;
wherein said audio processor reduces, from the first audio signal based on the first audio signal and the second audio signal, influence of the noise generated upon driving said driven unit, and
said second microphone unit is arranged at a position where a relative position relationship with said driving unit does not change even if said driving unit is moved.

23. The system according to claim 22, wherein the second microphone is fixed to the same member as a member of said driven unit.

24. The system according to claim 22, wherein said driven unit includes a lens unit.

25. The system according to claim 22, wherein said driven unit includes a diaphragm mechanism.

26. The system according to claim 22, wherein said audio processor detects a propagation characteristic of the noise generated upon driving the driven unit to said first microphone unit.

27. The system according to claim 26, wherein said audio processor reduces the first audio signal based on the detected propagation characteristic.

* * * * *